Figure 1:
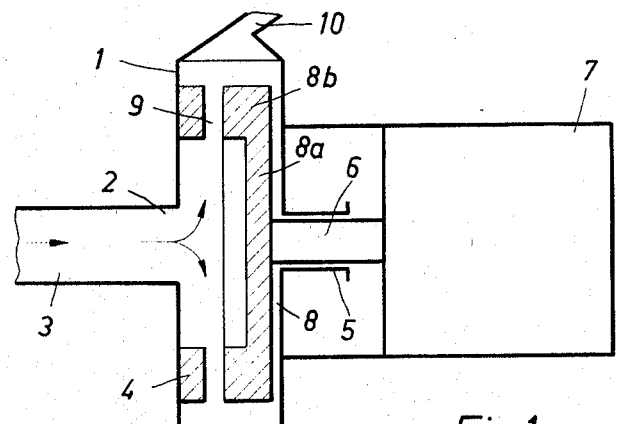

Dec. 6, 1966  G. STAPELFELDT  3,290,018
METHOD OF PRODUCING CONCRETE
Filed Aug. 4, 1965

Inventor:
Gerhard Stapelfeldt

United States Patent Office 3,290,018
Patented Dec. 6, 1966

3,290,018
METHOD OF PRODUCING CONCRETE
Gerhard Stapelfeldt, Berlin, Germany, assignor to Spezialbaustoff-Vertrieb Nordwest G.m.b.H., Dusseldorf, Germany
Filed Aug. 4, 1965, Ser. No. 477,675
Claims priority, application Germany, Aug. 5, 1964, S 92,479
11 Claims. (Cl. 259—146)

The present invention relates to a method of producing concrete, and more particularly to a method of increasing the effectiveness of the hydrating binder constituent of the concrete.

The method is applicable to the production of all kinds of concrete which require a hydrating binder, such as cement concrete and lime concrete.

The method of the present invention is particularly advantageous in connection with producing a lightweight lime concrete, i.e., a concrete having a specific weight of between about 250 and 1,600 kg./m.$^3$. It is possible, in accordance with the present invention, to produce a lightweight lime concrete body having a uniform compression resistance which is equal to between about 25 and 200 kp./cm.$^2$.

The compression resistance of concrete formed with hydrating binders is to a high degree dependent on the proportion of binder and on the degree of comminution of the same. If the proportion of binder is too small or if the surface area of the binder particles is relatively small in relation to the volume thereof, or if the proportion of binder is too great, a very considerable reduction in the pressure or compression resistance of the concrete will be experienced. Furthermore, the quality of the concrete will be decisively influenced by the extent to which the concrete mixture still contains calcium hydroxide which has not been converted in the calcium silicates. The proportion or amount of calcium hydroxide is essentially dependent on the degree to which the surfaces of the silicate particles and particularly the surfaces of the cement or lime particles have been opened up. In other words, it is desired that these particles have the largest possible surface area relative to the particle volume.

If the surface of the particles of for instance burnt lime (the term "lime" is intended to denote herein "burnt lime") are insufficiently opened up, then a relatively small surface area is available for reaction between the hydrating binder such as lime and the silicic aggregate. It follows that by adding silicic aggregate such as quartz powder in an amount such that the lime requirements of the silicate are satisfied with certainty, the concrete will contain an excess of calcium hydroxide. The silicic aggregates, usually quartz power, are generally opened up by grinding.

It is very difficult to produce a homogeneous suspension by wet dressing or milling of dry stone powders, due to the fact that agglomerations are formed. To the inventor's knowledge it was not possible up to now in the large scale or commercial production of concrete to form a homogeneous dispersion of stone powders and lime in water. In view thereof a certain degree of uncertainty exists with respect to the strength characteristics particularly of lime concrete and lightweight lime concrete.

It is therefore an object of the present invention to overcome the above discussed difficulties.

It is a further object of the present invention to provide a method of producing a hydrating binder-containing concrete, such as lime concrete or cement concrete and particularly lightweight lime concrete which will result in a concrete of predictable uniform strength characteristics.

It is a further object of the present invention to provide a method of producing concrete wherein the hydrating constituent such as lime or cement will be opened up to a large and uniform degree.

Other objects and advantages of the present invention will become apparent from a further reading of the description and of the appended claims.

With the above and other objects in view, the present invention contemplates in a method of producing concrete, the steps of introducing between substantially parallel, annular surface having median portions rotating relative to each other at a predetermined speed and being spaced from each other at a predetermined distance so as to form an annular space of predetermined width therebetween, in the vicinity of the inner edges of the annular surfaces, a flowable mass including an aqueous liquid and a pulverulent hydrating binder, the predetermined width being equal to up to 10 times the average maximum particle size of the pulverulent hydrating binder, and the predetermined median speed of the annular surfaces relative to each other being equal to between 30,000 and 200,000 times the predetermined distance per second, the flowable mass passing, under the influence of centrifugal force, outwardly through the annular space while simultaneously the particles of the hydrating binder are subjected to shearing forces between the annular surfaces rotating relative to each other and withdrawing the thus-treated flowable mass in the vicinity of the outer edges of the annular surfaces.

An object which is thus accomplished according to the present invention, is an improvement in the uniformity and quality, particularly with respect to the strength characteristics of the concrete, especially in the case of lightweight lime concrete, but not limited thereto. The uncontrollable variations in the quality, particularly the compression strength of such concrete, which represented a substantial unsolved problem, are greatly reduced in accordance with the present invention.

According to the present invention, a mixture of water and of a hydrating binding agent which can be rheologically worked up, i.e., a mixture which lends itself to being treated in its flowable state, and wherein the average maximum particle size of the hydrating binder material preferably does not exceed 0.2 mm., is introduced into a gap formed between two annular surfaces, from the inner edges of the annular surfaces, and its withdrawn from or in the vicinity of the outer edges of the annular surfaces. The distance between the two at least substantially parallel annular surfaces is so adjusted as to be at most equal to 10 times the average maximum particle size of the hydrating binder, and the two annular surfaces are rotated relative to each other at a mean rotational speed which equals per second between 30,000 and 200,000 times the distance between the two annular surfaces. The term "average maximum particle size" is intended to indicate that at least 90% by weight of the pulverulent material passes through a sieve having a mesh width equal to the numerical value of the average maximum particle size. For instance, the pulverulent material will have an average maximum particle size of 0.09 mm. if at least 90% by weight of the material passes through a sieve having a mesh width of 0.09 mm. The particle size of the silicate and lime or cement particles may vary widely depending on the qualities desired in the concrete produced thereof. The average maximum particle size of all solid constituents of the flowable mass, i.e., aqueous suspension in highly fluid or more viscous condition, will contain solid constituents preferably of average maximum particle size of up to 0.2 mm. For instance, quartz powder as the silicate material may be used having an average maximum particle size of about 0.1 mm. and calcium oxide or lime having an average maximum particle size of 0.085 mm., or cement having an average maximum particle size of 0.05 mm.

In the space or gap between the two annular discs having annular surfaces facing each other and defining the gap, the lime or cement particles and the silicate particles of the flowable mixture will move under the influence of centrifugal force in a turbulent manner whereby the hydrated surfaces of the lime or cement particles will be sheared off.

A device for carrying out the method of the present invention may comprise, for instance, two circular discs arranged coaxially and parallel to each other, of which one represents the stator and remains stationary, whereas the other respresents the rotor and rotates about the common shaft or axis. Thereby, outer annular surface portions of the two discs which face each other will form between themselves an annular gap or space through which the flowable mixture, which is introduced into the gap at its end portion which is closer to the axis of the two discs, passes outwardly under the influence of centrifugal force towards the outer end portion of the gap and flows from there into a collecting trough or the like. For instance, the diameter of the two parallel discs may be 1,000 mm. and the radial width of the annular, gap-forming surface portions may be 150 mm. In other words, the annular space or gap may be located between 850 and 1,000 mm. from the axis of the discs. The gap between the two annular surfaces, or the distance between the two facing annular surface portions may be adjustable between about 0.1 and 2 or more millimeters.

A mixture of lime, preferably finely ground calcium oxide, and of the required amount of water, preferably also containing silicic aggregate, for instance quartz powder, and having a consistency such that it can be rheologically worked up, is continuously introduced into the above described device, after the gap or the width of the space between the two annular surfaces has been adjusted in accordance with the particle size of the solid constituents of the mixture.

Figure 2:
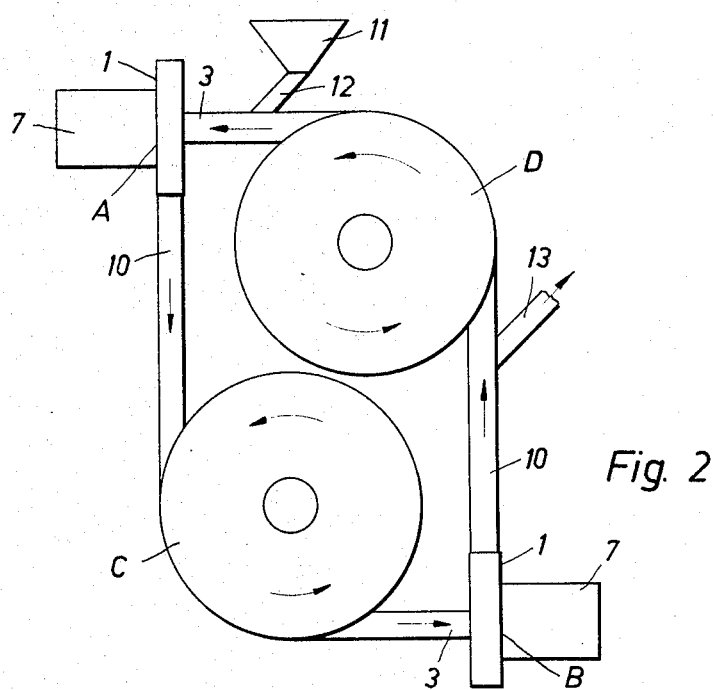

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a schematic, cross-sectional plan view of a device for carrying out the present invention; and FIG. 2 is a schematic plan view of another embodiment of a device which may be used for carrying out the method of the present invention.

Referring now to the drawing, and particularly FIG. 1, it will be seen that the device comprises a cylindrical housing 1, having an inner diameter of 1,400 mm. and inner axial width of 150 mm. Housing 1 is formed with an axially arranged opening 2 communicating with conduit 3 serving for introduction of the mixture of water, silicate and hydrating binder into the housing. The housing is also formed with an outlet 10, tangentially arranged at the circumference of the cylindrical housing. A concentric ring 4 is attached to a side wall of the housing and has an outer diameter of 1,200 mm., an inner diameter of 800 mm., and a thickness of 15 mm. This ring forms an annular surface which is directed towards the interior of the housing. A shaft 6 is supported by bearing 5 and extends coaxially with the cylindrical housing and conduit 3 into the housing through the side wall opposite to that carrying ring 4. Shaft 6 is driven by electric motor 7 and has fixedly attached to its free end within housing 1 a disc 8 having in its center portion 8a a thickness of 15 mm. and at its peripheral portion 8b a thickness of 30 mm. The outer diameter of disc portion 8b is 1,200 mm. and its inner diameter 800 mm., corresponding to the outer and inner diameter of ring 4, and portion 8b of disc 8 is juxtaposed to ring 4 so that between these two elements a space or gap 9 is formed which may be adjusted to any desired width, for instance a width of between about 0.1 mm. and 3 mm. The motor can be adjusted, either directly or by means of a transmission gear (not shown) located between motor 7 and shaft 6, so that disc 8 will rotate at a desired speed between about 600 and 2000 r.p.m.

Generally, it is advisable to repeat the treatment of the flowable mixture by passing the mixture several times through the above described device. If the hydrating binder consists of lime, then it is preferred to pass the mixture between about 4 and 8 times through the device, and if the hydrating binder consists of cement, it is preferred to pass the mixture between about 6 and 10 times through the device. Repeated passage of the mixture through the device can be accomplished by arranging several devices according to FIG. 1 in sequence so that the mixture passes successively through all of the individual devices.

However, as illustrated in FIG. 2, it is also possible to arrange two shearing devices in such a manner that the mixture will pass several times through the two shearing devices.

As illustrated in FIG. 2, the devices A and B each have substantially the shape and configuration of the device illustrated in FIG. 1, including housing 1 with ring and disc elements 4 and 8 therein and motor drive 7. Conduit 3 of device A of FIG. 2 may be optionally connected with conduit 12 communicating with stirring vat D, or with feed hopper or device 11. The flowable mass introduced axially into shearing device A is withdrawn tangentially through conduit 10 and passes into stirring vat C wherein it is maintained in suspension. Stirring vat C communicates with inlet conduit 3 of shearing device B, and outlet conduit 10 of shearing device B introduces the flowable mixture either into outlet conduit 13, or into stirring vat D from where, through conduits 12 and 3, the treated mixture passes again to shearing device A.

In the embodiment illustrated in FIG. 2, the originally formed flowable aqueous mixture passes from feeding device or funnel 11 into shearing device A (corresponding to the device illustrated in FIG. 1), from there by way of stirring vat C into shearing device B (also corresponding to that shown in FIG. 1) and then by way of stirring vat D back into shearing device A.

This circular flow may be repeated as long as desired, until finally withdrawal conduit 13 is opened and the treated material is withdrawn therethrough, while simultaneously or subsequently new untreated mixture is introduced through funnel 11.

Assuming that the solid constituents of the flowable mixture have been ground to an average maximum particle size of 0.1 mm., the discs of the above described device will be arranged at such distance from each other that the width of the gap between the facing annular surface portions will be equal to between about 0.1 and 0.8 mm., and the rotor will rotate at between about 600 and 2,000 revolutions per minute. In this case, the outer edge of the annular surface of the rotor will have a peripheral speed of between about 30 and 110 m./sec. which corresponds to the above described requirement which may also be indicated by stating that the peripheral speed of the annular surfaces relative to each other expressed in meters per second preferably will be equal to between 60–150 times the distance between the annular surfaces expressed in millimeters. Due to the thus caused high shearing speed and the quick sequence of underpressure and overpressure formed along the turbulent paths along which the mixture moves between the annular surfaces, a very complete dispersion of the silicic aggregate is achieved. Furthermore, agglomerates are fully broken up and the air contained in the mixture will be most finely subdivided.

Sometimes it is advisable to introduce air into the mixture prior to passing the same through the space between the annular surfaces.

The lime particles, for instance calcium oxide particles, will quickly react at their surfaces with the water of the mixture under formation of calcium hydroxide. The thus hydrated surface portions of the lime particles are then immediately sheared off so that the size of the lime particles will be reduced and continuously new non-hydrated calcium oxide surface portions will be exposed to the surrounding water and will react with the same under formation of calcium hydroxide. Consequently, the method of the present invention will cause a very complete opening up of the lime particles simultaneosuly with the forming of an intimate mixture between very finely subdivided calcium hydroxide particles and particles of the silicic aggregate. This will favor to a very high degree the desired formation of calcium silicate gels. The binder material preferably will be either lime or cement or a mixture of lime and cement. In any event, it is an advantage of the present invention that the proportion of binder material which is required will be smaller than that required according to conventional methods.

The present method is particularly suitable for producing homogeneous, macroporous, so-called gas concrete. The lime requirements in this case will be reduced by 20% or more as compared with the lime requirements for producing a similar gas concrete by conventional methods.

It is possible according to the present invention to produce microporous lightweight concrete having a specific weight of more than one kilogram per thousand cm$^3$. and a relatively high compression resistance.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid and a pulverulent hydrating binder, said predetermined width being equal to up to 10 times the average maximum particle size of said pulverulent hydrating binder, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

2. In a method of producing concrete, the steps of introducing between substantially parellel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid and a pulverulent hydrating binder including at least one substance selected from the group consisting of lime and cement, said predetermined width being equal to up to 10 times the average maximum particle size of said pulverulent hydrating binder, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

3. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid and lime as a pulverulent hydrating binder, said predetermined width being equal to up to 10 times the average maximum particle size of said pulverulent hydrating binder, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

4. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid and cement as a pulverulent hydrating binder, said predetermined width being equal to up to 10 times the average maximum particle size of said pulverulent hydrating binder, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

5. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid, a pulverulent silicate and a pulverulent hydrating binder, said predetermined width being equal to up to 10 times the average maximum particle size of said pulverulent hydrating binder, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

6. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid, pulverulent quartz and a pulverulent hydrating binder, said predetermined width being equal to up to 10 times the average maximum particle size of said pulverulent hydrating binder, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

7. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid and a pulverulent hydrating binder and having air distributed therethrough, said predetermined width being equal to up to 10 times the average maximum particle size of said pulverulent hydrating binder, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

8. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid and a pulverulent hydrating binder, said predetermined width being equal to up to 10 times the average maximum particle size of said pulverulent hydrating binder, and said predetermined peripheral speed of said annular surfaces relative to each other being equal to between about 60,000 and 150,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

9. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid and a pulverulent hydrating binder having an average maximum particle size of up to 0.2 mm., said predetermined width being equal to up to 10 times the average maximum particle size of said pulverulent hydrating binder, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

10. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid, pulverulent silicate and a pulverulent hydrating binder including at least one substance selected from the group consisting of lime and cement and having air distributed therethrough, said pulverulent binder having an average maximum particle size of up to 0.2 mm., said predetermined width being equal to up to 10 times the average maximum particle size of said pulverulent hydrating binder, and said predetermined peripheral speed of said annular surfaces relative to each other being equal to between about 60,000 and 150,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

11. In a method of producing concrete, the steps of introducing between substantially parallel, annular surfaces rotating relative to each other at a predetermined peripheral speed and being spaced from each other at a predetermined distance so as to form an annular space of predetermined width therebetween, in the vicinity of the inner edges of said annular surfaces, a flowable mass including an aqueous liquid pulverulent solid means of a silicid aggregate, and a hydrating binder, the average maximum particle size of said silicid aggregate and of said binder being less than 0.2 mm., said predetermined width being equal to up to 10 times the average maximum particle size of said pulverulent solid mass, and said predetermined peripheral speed of said annular surfaces relative to each other being equal to between about 30,000 and 200,000 times said predetermined distance per second, said flowable mass passing, under the influence of centrifugal force, outwardly through said annular space while simultaneously the particles of said hydrating binder are subjected to shearing forces between said annular surfaces rotating relative to each other; and withdrawing the thus-treated flowable mass in the vicinity of the outer edges of said annular surfaces.

References Cited by the Examiner

UNITED STATES PATENTS

| | | | |
|---|---|---|---|
| 1,660,280 | 2/1928 | Thomson | 259—146 |
| 2,316,705 | 4/1943 | Morgan et al. | 259—146 |
| 2,522,936 | 9/1950 | Ferguson | 259—151 |
| 3,118,656 | 1/1964 | Witt | 259—146 |
| 3,248,093 | 4/1966 | Demaison | 259—151 |

WALTER A. SCHEEL, *Primary Examiner.*

R. W. JENKINS, *Assistant Examiner.*